(12) United States Patent
Sønnichsen

(10) Patent No.: US 12,726,775 B2
(45) Date of Patent: Sep. 1, 2026

(54) HEARING DEVICE WITH MULTIPLE INPUT MULTIPLE OUTPUT DC-DC CONVERTER

(71) Applicant: GN Hearing A/S, Ballerup (DK)

(72) Inventor: Christian Westmark Sønnichsen, København (DK)

(73) Assignee: GN HEARING A/S, Ballerup (DK)

( * ) Notice: Subject to any disclaimer, the term of this patent is extended or adjusted under 35 U.S.C. 154(b) by 176 days.

(21) Appl. No.: 18/658,064

(22) Filed: May 8, 2024

(65) Prior Publication Data

US 2025/0024207 A1 Jan. 16, 2025

(30) Foreign Application Priority Data

Jul. 11, 2023 (EP) .................................... 23184842

(51) Int. Cl.
*H04R 25/00* (2006.01)
*H02M 3/07* (2006.01)
*H04R 25/02* (2006.01)

(52) U.S. Cl.
CPC ............ *H04R 25/407* (2013.01); *H02M 3/07* (2013.01); *H04R 25/602* (2013.01); *H04R 25/02* (2013.01); *H04R 2225/31* (2013.01)

(58) Field of Classification Search
CPC . H04B 5/45; H04B 5/266; H04B 5/70; H04B 5/79; H04R 25/305; H04R 25/604;
(Continued)

(56) References Cited

U.S. PATENT DOCUMENTS

2008/0159567 A1* 7/2008 Lesso ........................ H03F 1/56 381/120
2013/0148818 A1* 6/2013 Yamkovoy ........... H04R 1/1041 381/74

(Continued)

FOREIGN PATENT DOCUMENTS

EP 3447894 2/2019

OTHER PUBLICATIONS

IEEE Journal of Solid-State Circuits—vol. 52 No. 7 Nicolas Butzen (Year: 2017).*

(Continued)

*Primary Examiner* — Carolyn R Edwards
*Assistant Examiner* — Julie X Dang
(74) *Attorney, Agent, or Firm* — Vista IP Law Group, LLP

(57) ABSTRACT

A hearing device includes: an input transducer configured to provide a microphone input transducer signal based on captured sound; a signal processing unit configured to provide an output signal based on a processed input transducer signal; an output transducer configured to provide a stimulation output signal based on the output signal; a battery configured to provide a battery cell voltage; and a multiple-input-multiple-output (MIMO) switched capacitor (SC) DC-DC converter coupled to the battery and comprising: two or more inputs, each of the two or more inputs configured to receive a voltage input, and two or more outputs configured to provide respective voltage outputs, the voltage outputs being different from each other, wherein at least two of the two or more outputs are capable of providing the respective voltage outputs simultaneously; the MIMO SC DC-DC converter configured to convert one of the voltage inputs to one of the voltage outputs.

19 Claims, 7 Drawing Sheets

(58) Field of Classification Search
CPC .. H04R 25/554; H04R 25/552; H04R 25/656; H04R 25/558; H04R 2225/023; H04R 2225/31; H04R 2460/15; H04R 3/00; H04R 25/602; H04R 25/609; H04R 25/407; H04R 25/02; H04R 2225/57; H04R 2225/33; H04R 1/1025; H02M 1/009; H02M 3/075; H02M 3/07; H02M 1/10
See application file for complete search history.

(56) References Cited

U.S. PATENT DOCUMENTS

| | | | | |
|---|---|---|---|---|
| 2016/0365753 | A1* | 12/2016 | Lee | H02J 50/20 |
| 2019/0068053 | A1* | 2/2019 | Larsen | H04R 25/609 |
| 2019/0165671 | A1* | 5/2019 | Gudnason | H04R 25/554 |
| 2022/0386045 | A1* | 12/2022 | Christensen | H04R 25/602 |

OTHER PUBLICATIONS

Extended European Search Report for EP Patent Appln. No. 23184842.5 dated Dec. 21, 2023.

Fiori, F., "Design of a Switched-Capacitor Step-Down Converter," Department of Electronics and Telecommunications, Politecnico Di Tornio, Apr. 2018.

Butzen, N., et al., "MIMO Switched-Capacitor DC-DC Converters Using Only Parasitic Capacitances Through Scalable Parasitic Charge Redistribution," IEEE Journal of Solid-State Circuits, vol. 52, No. 7, Jul. 2017.

Liu, J., et al., "Switched-Capacitor Boost-Buck Ladder Converters With Extended Voltage Range in Standard CMOS," IEEE Transactions on Circuits and Systems—I: Regular Papers, vol. 67, No. 12, Dec. 2020.

Meyvaert, H., et al., "A Light-Load-Efficient 11/1 Switched-Capacitor DC-DC Convertor with 94.7% Efficiency While Delivering 100mW at 3.3V," ISSCC 2015, Session 20, Energy Harvesting and SC Power Conversion.

* cited by examiner

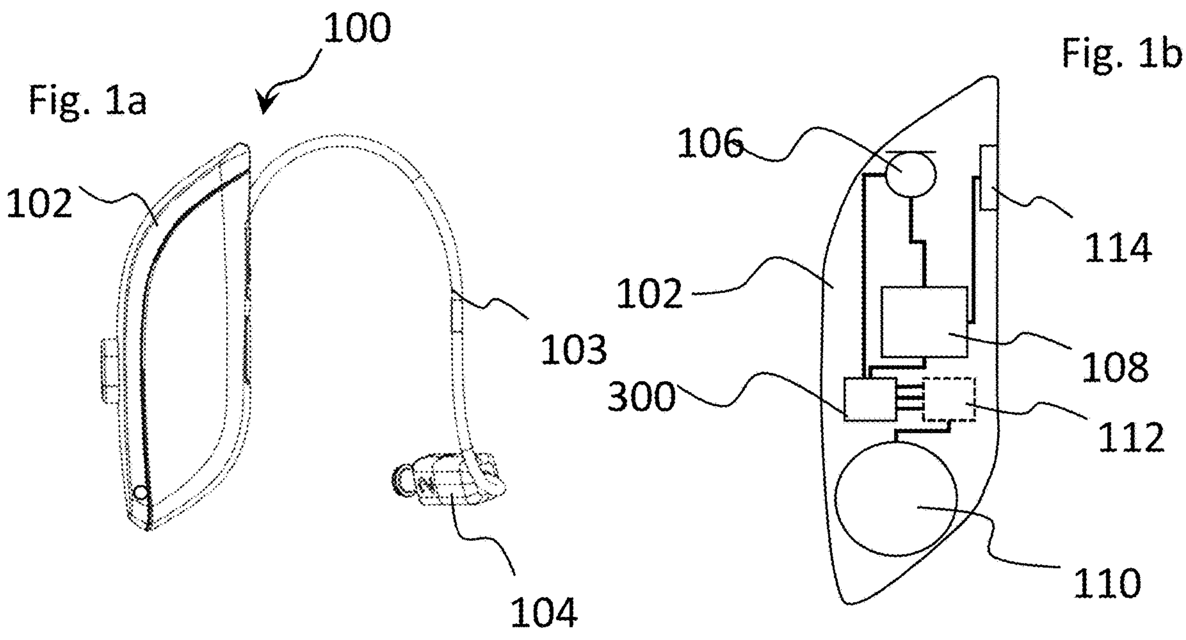
Fig. 1a
100
102
103
104
Fig. 1b
106
114
102
108
300
112
110
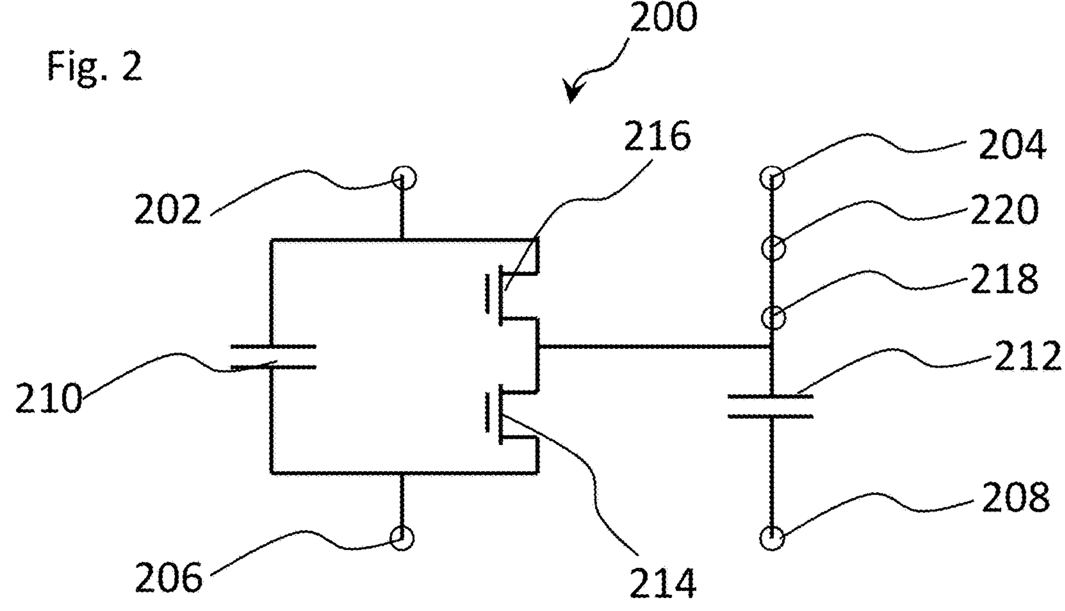
Fig. 2
200
216
202
204
220
218
210
212
206
214
208

300
314
308
302
306
304
310
312
n 300
316
318
320
n

ZnO Battery (Input: Vo2)

| VCR | Vo6 | Vo5 | Vo4 | Vo3 | Vo2 | Vo1 |
|---|---|---|---|---|---|---|
| 0,167 | 3,90 | 3,25 | 2,60 | 1,95 | 1,30 | 0,65 |
| 0,167 | 3,75 | 3,13 | 2,50 | 1,88 | 1,25 | 0,63 |
| 0,167 | 3,60 | 3,00 | 2,40 | 1,80 | 1,20 | 0,60 |
| 0,167 | 3,45 | 2,88 | 2,30 | 1,73 | 1,15 | 0,58 |
| 0,167 | 3,30 | 2,75 | 2,20 | 1,65 | 1,10 | 0,55 |
| 0,167 | 3,15 | 2,63 | 2,10 | 1,58 | 1,05 | 0,53 |
| 0,167 | 3,00 | 2,50 | 2,00 | 1,50 | 1,00 | 0,50 |

2xZnO Battery (Input: Vo4)

| VCR | Vo6 | Vo5 | Vo4 | Vo3 | Vo2 | Vo1 |
|---|---|---|---|---|---|---|
| 0,167 | 3,90 | 3,25 | 2,60 | 1,95 | 1,30 | 0,65 |
| 0,167 | 3,75 | 3,13 | 2,50 | 1,88 | 1,25 | 0,63 |
| 0,167 | 3,60 | 3,00 | 2,40 | 1,80 | 1,20 | 0,60 |
| 0,167 | 3,45 | 2,88 | 2,30 | 1,73 | 1,15 | 0,58 |
| 0,167 | 3,30 | 2,75 | 2,20 | 1,65 | 1,10 | 0,55 |
| 0,167 | 3,15 | 2,63 | 2,10 | 1,58 | 1,05 | 0,53 |
| 0,167 | 3,00 | 2,50 | 2,00 | 1,50 | 1,00 | 0,50 |

2xZnO Battery (Alternative) (Input: Vo3)

| VCR | Vo6 | Vo5 | Vo4 | Vo3 | Vo2 | Vo1 |
|---|---|---|---|---|---|---|
| 0,167 | 5,20 | 4,33 | 3,47 | 2,60 | 1,73 | 0,87 |
| 0,167 | 5,00 | 4,17 | 3,33 | 2,50 | 1,67 | 0,83 |
| 0,167 | 4,80 | 4,00 | 3,20 | 2,40 | 1,60 | 0,80 |
| 0,167 | 4,60 | 3,83 | 3,07 | 2,30 | 1,53 | 0,77 |
| 0,167 | 4,40 | 3,67 | 2,93 | 2,20 | 1,47 | 0,73 |
| 0,167 | 4,20 | 3,50 | 2,80 | 2,10 | 1,40 | 0,70 |
| 0,167 | 4,00 | 3,33 | 2,67 | 2,00 | 1,33 | 0,67 |

| | Input | | | | | |
|---|---|---|---|---|---|---|
| VCR | Vo6 | Vo5 | Vo4 | Vo3 | Vo2 | Vo1 |
| 0,167 | 4,20 | 3,50 | 2,80 | 2,10 | 1,40 | 0,70 |
| 0,167 | 4,10 | 3,42 | 2,73 | 2,05 | 1,37 | 0,68 |
| 0,167 | 4,00 | 3,33 | 2,67 | 2,00 | 1,33 | 0,67 |
| 0,167 | 3,90 | 3,25 | 2,60 | 1,95 | 1,30 | 0,65 |
| 0,167 | 3,80 | 3,17 | 2,53 | 1,90 | 1,27 | 0,63 |
| 0,167 | 3,70 | 3,08 | 2,47 | 1,85 | 1,23 | 0,62 |
| 0,167 | 3,60 | 3,00 | 2,40 | 1,80 | 1,20 | 0,60 |
| 0,167 | 3,50 | 2,92 | 2,33 | 1,75 | 1,17 | 0,58 |
| 0,167 | 3,40 | 2,83 | 2,27 | 1,70 | 1,13 | 0,57 |
| 0,167 | 3,30 | 2,75 | 2,20 | 1,65 | 1,10 | 0,55 |
| 0,167 | 3,20 | 2,67 | 2,13 | 1,60 | 1,07 | 0,53 |
| 0,167 | 3,10 | 2,58 | 2,07 | 1,55 | 1,03 | 0,52 |
| 0,167 | 3,00 | 2,50 | 2,00 | 1,50 | 1,00 | 0,50 |
| 0,167 | 2,90 | 2,42 | 1,93 | 1,45 | 0,97 | 0,48 |
| 0,167 | 2,80 | 2,33 | 1,87 | 1,40 | 0,93 | 0,47 |

*Table 1 shows the voltage output, given in Volts, provided by the voltage nodes, depending on the voltage level of a voltage input applied to $V_{o6}$.*

FIG. 9

| | | Input | | | | |
|---|---|---|---|---|---|---|
| VCR | Vo6 | Vo5 | Vo4 | Vo3 | Vo2 | Vo1 |
| 0,20 | 5,04 | 4,20 | 3,36 | 2,52 | 1,68 | 0,84 |
| 0,20 | 4,92 | 4,10 | 3,28 | 2,46 | 1,64 | 0,82 |
| 0,20 | 4,80 | 4,00 | 3,20 | 2,40 | 1,60 | 0,80 |
| 0,20 | 4,68 | 3,90 | 3,12 | 2,34 | 1,56 | 0,78 |
| 0,20 | 4,56 | 3,80 | 3,04 | 2,28 | 1,52 | 0,76 |
| 0,20 | 4,44 | 3,70 | 2,96 | 2,22 | 1,48 | 0,74 |
| 0,20 | 4,32 | 3,60 | 2,88 | 2,16 | 1,44 | 0,72 |
| 0,20 | 4,20 | 3,50 | 2,80 | 2,10 | 1,40 | 0,70 |
| 0,20 | 4,08 | 3,40 | 2,72 | 2,04 | 1,36 | 0,68 |
| 0,20 | 3,96 | 3,30 | 2,64 | 1,98 | 1,32 | 0,66 |
| 0,20 | 3,84 | 3,20 | 2,56 | 1,92 | 1,28 | 0,64 |
| 0,20 | 3,72 | 3,10 | 2,48 | 1,86 | 1,24 | 0,62 |
| 0,20 | 3,60 | 3,00 | 2,40 | 1,80 | 1,20 | 0,60 |
| 0,20 | 3,48 | 2,90 | 2,32 | 1,74 | 1,16 | 0,58 |
| 0,20 | | 2,80 | 2,24 | 1,68 | 1,12 | 0,56 |

*Table 2 shows the voltage output provided by the voltage nodes, depending on the voltage level of a voltage input applied to $V_{o5}$.*

FIG. 10

| | | | Input | | | |
|---|---|---|---|---|---|---|
| VCR | Vo6 | Vo5 | Vo4 | Vo3 | Vo2 | Vo1 |
| 0,25 | 6,30* | 5,25* | 4,20* | 3,15* | 2,10* | 1,05* |
| 0,25 | 6,15* | 5,13* | 4,10* | 3,08* | 2,05* | 1,03* |
| 0,25 | 6,00 | 5,00 | 4,00 | 3,00 | 2,00 | 1,00 |
| 0,25 | 5,85 | 4,88 | 3,90 | 2,93 | 1,95 | 0,98 |
| 0,25 | 5,70 | 4,75 | 3,80 | 2,85 | 1,90 | 0,95 |
| 0,25 | 5,55 | 4,63 | 3,70 | 2,78 | 1,85 | 0,93 |
| 0,25 | 5,40 | 4,50 | 3,60 | 2,70 | 1,80 | 0,90 |
| 0,25 | 5,25 | 4,38 | 3,50 | 2,63 | 1,75 | 0,88 |
| 0,25 | 5,10 | 4,25 | 3,40 | 2,55 | 1,70 | 0,85 |
| 0,25 | 4,95 | 4,13 | 3,30 | 2,48 | 1,65 | 0,83 |
| 0,25 | 4,80 | 4,00 | 3,20 | 2,40 | 1,60 | 0,80 |
| 0,25 | 4,65 | 3,88 | 3,10 | 2,33 | 1,55 | 0,78 |
| 0,25 | 4,50 | 3,75 | 3,00 | 2,25 | 1,50 | 0,75 |
| 0,25 | 4,35 | 3,63 | 2,90 | 2,18 | 1,45 | 0,73 |
| 0,25 | 4,20 | 3,50 | 2,80 | 2,10 | 1,40 | 0,70 |

*Table 3 shows the voltage output provided by the voltage nodes, depending on the voltage level of a voltage input applied to $V_{o4}$.*

FIG. 11

HEARING DEVICE WITH MULTIPLE INPUT MULTIPLE OUTPUT DC-DC CONVERTER

RELATED APPLICATION DATA

This application claims priority to, and the benefit of, European Patent Application No. 23184842.5 filed on Jul. 11, 2023, pending. The entire disclosure of the above application is expressly incorporated by reference herein.

FIELD

The present disclosure relates to a hearing device comprising a multiple input multiple output, MIMO, switched capacitor, SC, DC-DC converter.

BACKGROUND

Modern hearing devices comprise chipsets that incorporate a wide variety of switched capacitor, SC, DC-DC power converters to provide efficient voltage conversion from the input voltage levels of their power units, e.g., lithium-ion batteries, which typically provide a battery cell voltage in the range from ~4.2 V to ~2.8 V depending on the battery's state of charge, and down to lower voltages. This down-conversion is crucial in ensuring a long-lasting source of power while enabling increasingly power-demanding functions in the hearing device. Many hearing devices utilize multiple voltage levels below that of the input voltage level in order to minimize power consumption. To provide these supply voltages, hearing devices have been provided with multiple SC DC-DC converters in addition to several linear regulators, each of which degrades the power conversion efficiency.

The use of such converters is often inefficient from a power efficiency perspective. Even with good power conversion efficiency from each SC DC-DC power converter, achieving a good power conversion efficiency when stepping down the voltage multiple times remains a challenge.

Using multiple SC converters further requires a large amount of off-chip multilayer ceramic capacitors. This increases the printed circuit board area, and consequently the total volume of the electronics, which can be an issue, especially for miniature devices such as hearing aids and ear buds. Furthermore, many SC converter topologies require high-voltage, HV, power switches and therefore a process with HV transistors which may limit their integrability in modern low-voltage integrated circuit, IC, process nodes and require dedicated HV processes or additional process options.

Additionally, SC converters are electromagnetic interference, EMI, aggressors with varying switching frequencies, pulse widths and/or pulse densities, which means that careful switching frequency/load current planning is required to avoid interference in adjacent radio systems.

Furthermore, systems comprising multiple SC converters are interdependent, causing additional design challenges including startup-sequencing.

EP 3 447 894 B1 relates to a head-wearable hearing device comprising a multiple-output switched capacitor DC-DC converter. Said multiple-output switched capacitor DC-DC converter comprises a switch matrix comprising a plurality of individually controllable semiconductor switches and a plurality of flying capacitors connected between respective sets of circuit nodes of the switch matrix. A controller is connected to respective control terminals of the plurality of individually controllable semiconductor switches of the switch matrix to configure first and second converter sections to form first and second converter topologies, respectively, based on a topology selection rule. However, this disclosure does not support multiple input voltages and only provides a single output voltage at a time depending on the configuration of the SC DC-DC converter circuit.

It is an object to overcome one or more of the above-mentioned shortcomings.

SUMMARY

One or more of the above-mentioned shortcomings are overcome by a hearing device configured to be worn at an ear of a user. The hearing device comprises an input transducer adapted for capturing sound and providing a microphone input transducer signal based on the captured sound. The hearing device comprises a signal processing unit adapted for processing the input transducer signal and providing an output signal based on the processed input transducer signal. The hearing device comprises an output transducer adapted for providing a stimulation output signal based on the output signal. The hearing device comprises a battery configured for providing a battery cell voltage. The hearing device comprises a multiple input multiple output, MIMO, switched capacitor, SC, DC-DC converter coupled to the battery. The MIMO SC DC-DC converter comprises two or more inputs, each adapted for receiving a voltage input. The MIMO SC DC-DC converter comprises two or more outputs, each adapted for providing a voltage output of a different voltage from the other outputs. At least two of the two or more outputs can provide a voltage output simultaneously. The MIMO SC DC-DC converter is configured for converting each voltage input to a voltage output of a different voltage.

It is an advantage that the MIMO SC DC-DC converter comprises multiple inputs configured for receiving different input voltages as this allows the hearing MIMO SC DC-DC converter to maintain efficient power conversion and supply of power, even during use as the battery is depleted and the battery cell voltage drops, as the battery may be coupled to the input configured for receiving the voltage input closest to the current battery cell voltage.

The disclosed MIMO SC DC-DC converter can replace multiple current SC converters in existing hearing devices while providing higher conversion efficiencies to more voltage levels. The converter can make use of an integrated voltage input demultiplexer, which allows efficient conversion across a battery's, e.g., lithium-ion, discharge cycle. For zinc-air battery support, the battery should merely be routed to another voltage input, corresponding to a minimal product change.

While the MIMO SC DC-DC converter is slightly more complex during start-up than some of the existing series-parallel converters, the overall system complexity is reduced by replacing multiple converters by one MIMO SC DC-DC converter. This also applies to EMI issues, which current SC converters often are associated with.

The disclosed MIMO SC DC-DC converter's power switches can occupy an area of less than 0.5 $mm^2$. This is because they can be implemented as highly efficient thin-oxide devices in semiconductor process nodes suitable for the hearing device's signal processing unit's chip. Often SC converters are implemented in more mature process node along with EMI- and noise-sensitive analog circuitry like analog-to-digital converters or radios. By moving the SC converter to an inherently noise-immune chip, it is possible to remove noisy switching regulators from the sensitive circuit types. The disclosed MIMO SC DC-DC converter can thus help enable a hearing device solution with a higher level of integration and fewer integrated circuits in the product.

One or more first electronic component(s) of the hearing device is/are coupled to a first output of the two or more outputs and one or more second electronic component(s) of the hearing device is/are coupled to a second output of the two or more outputs. It is noted that any of the named components, e.g., the microphone, the signal processing unit, and the output transducer, may be comprised in the one or more first electronic component(s) or in the one or more second electronic component(s).

It is worth noting, that the numerical definition of low and high voltage depends on context. In this context the terms high and low voltages are used in the context of micro electronic devices and are used relative to each other. Hence, for this text the differences between high voltage and low voltage might be less than 1 V, a voltage difference that can be a lot for certain transistor types to handle, in contrast to other fields of electrical engineering or a layman's definition which would categorize high voltage as starting around 1000-1500V depending on whether AC or DC voltage is used.

It should be noted that it is implied that a voltage output is an output from which an output current may be drawn. The current flowing out of the output voltage node may be positive or zero. The current flowing out of an output node may also be negative, as for example when the output node is used as an input node.

BRIEF DESCRIPTION OF THE FIGURES

The above and other features and advantages will become readily apparent to those skilled in the art by the following detailed description of exemplary embodiments thereof with reference to the attached drawings, in which:

FIG. 1*a* is a drawing of a hearing device,

FIG. 1*b* is a schematic drawing of a hearing device,

FIG. 2 is a schematic drawing of a voltage stage,

FIG. 9 shows a table.

FIG. 10 shows a table.

FIG. 11 shows a table.

DETAILED DESCRIPTION

Figure 3:
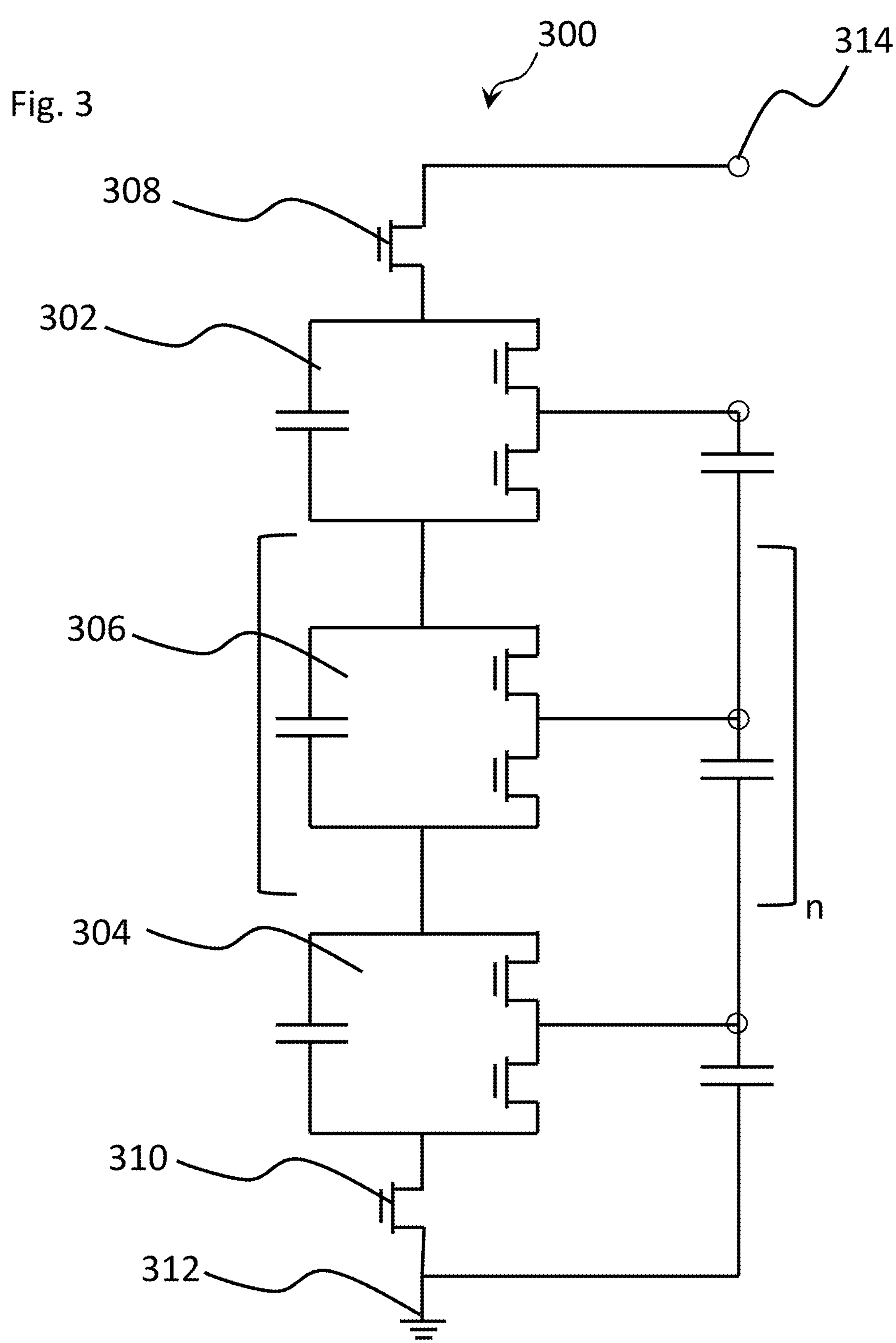
FIG. 3 is a schematic drawing of a multiple input multiple output switched capacitor DC-DC converter.

Various exemplary embodiments and details are described hereinafter, with reference to the figures when relevant. It should be noted that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The hearing device is configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a headset, headphone, earphone, earbud, hearing aid, a personal sound amplification product, PSAP, an over-the-counter, OTC, hearing device, a hearing protection device, a one-size-fits-all hearing device, a custom hearing device or another head-wearable hearing device. Hearing devices can include both prescription devices and non-prescription devices.

The hearing device may be embodied in various housing styles or form factors. Some of these form factors are Behind-the-Ear, BTE, hearing device, Receiver-in-Canal, RIC, hearing device, Receiver-in-Ear, RIE, also known as RITE, hearing device or Microphone-and-Receiver-in-Ear, MaRIE, hearing device. These devices may comprise a BTE unit configured to be worn behind the ear of the user and an in the ear, ITE, unit configured to be inserted partly or fully into the user's ear canal. Generally, the BTE unit may comprise at least one input transducer, a battery and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprise in the ITE unit, which is coupled to the BTE unit via a connector cable or wire configured for transferring electric signals between the BTE and ITE units.

Some of these form factors are In-the-Ear, ITE, hearing device, Completely-in-Canal, CIC, hearing device or Invisible-in-Canal, IIC, hearing device. These hearing devices may comprise an ITE unit, wherein the ITE unit may comprise at least one input transducer, a battery, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In an embodiment, the hearing device may comprise one or more input transducers, e.g., microphones. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device may comprise one or more antenna(s) configured for wireless communication. The one or more antenna(s) may comprise an electric antenna. The electric antenna may be configured for wireless communication at a first frequency. The first frequency may be above 800 MHZ, preferably a wavelength between 900 MHz and 6 GHZ. The first frequency may be 902 MHz to 928 MHz. The first frequency may be 2.4 to 2.5 GHZ. The first frequency may be 5,725 GHz to 5,875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g., enabling the user to listen to media, such as music or radio and/or enabling the user to perform phone calls.

In an embodiment, the wireless signal may originate from one or more external source(s) and/or external devices, such as spouse microphone device(s), wireless audio transmitter (s), smart computer(s) and/or distributed microphone array (s) associated with a wireless transmitter. The wireless input signal(s) may origin from another hearing device, e.g., as part of a binaural hearing system and/or from one or more accessory device(s), such as a smartphone and/or a smart watch.

In an embodiment, the hearing device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board, PCB. The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In an embodiment, the hearing device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g., for Receiver-in-Ear (RIE) unit or Microphone-and-Receiver-in-Ear (MaRIE) unit, of the hearing device. One or more of the input transducer(s) may be comprised in an ITE unit or in an earpiece.

The battery may be a rechargeable battery, e.g., a Li-Ion battery. The battery may be a replaceable battery. The hearing device may comprise a power management unit. The battery may be coupled to a charging coil configured for wireless recharging of the battery. The charging coil may be provided by the magnetic antenna. The battery may be a non-rechargeable battery, e.g., a ZnO battery.

In an embodiment, the hearing device may comprise a memory, including volatile and non-volatile forms of memory.

The voltage input may be the battery cell voltage.

The hearing device may further comprise an input power de-multiplexer comprising:

- a de-multiplexer input coupled to the battery,
- a first de-multiplexer output coupled to a first input of the two or more inputs, and
- a second de-multiplexer output coupled to a second input of the two or more inputs.

The input power de-multiplexer may comprise one or more further de-multiplexer outputs, each coupled to a different input of the two or more inputs. By providing a de-multiplexer, the battery may be coupled to the MIMO SC DC-DC converter in a manner that allows for efficient switching between inputs. This is particularly advantageous as the battery runs through its discharge cycle, as the de-multiplexer may channel the battery cell voltage to the input of the of the two or more inputs that is best suited for handling the current battery cell voltage.

The MIMO SC DC-DC converter may comprise multiple voltage stages, each voltage stage comprising:

- a flying capacitor having an upper flying capacitor terminal and a lower flying capacitor terminal,
- a second capacitor having an upper second capacitor terminal and a lower second capacitor terminal,
- a first switch, and
- a second switch.

The first switch may be a controllable semiconductor switch, e.g., a transistor. The first switch may comprise:

- an upper first switch terminal connected to the upper second capacitor terminal, and
- a lower first switch terminal connected to the lower flying capacitor terminal.

The second switch may be a controllable semiconductor switch, e.g., a transistor. The second switch may comprise:

- an upper second switch terminal connected to the upper flying capacitor terminal, and
- a lower second switch terminal connected to the upper second capacitor terminal.

Throughout this text, the terms "upper" and "lower" is used to describe an arrangement with regards to higher and lower voltage domains of the MIMO SC DC-DC converter, not a spatial arrangement. Alternatively, the terminology primary may be used instead of "upper", e.g., the upper flying capacitor terminal may also be denoted as the primary flying capacitor terminal, and the terminology secondary may be used instead of "lower", e.g., lower second capacitor terminal may also be denoted as the secondary second capacitor terminal.

The voltage stages may be coupled together so that each voltage stage below the highest voltage stage comprises:

a connection from the upper flying capacitor terminal to the lower flying capacitor terminal of the voltage stage above it, and a connection from the upper second capacitor terminal connected to the lower second capacitor terminal of the voltage stage above it.

The term "highest" voltage stage is used to denote the voltage stage configured for handling the highest voltage amongst the voltage stages.

The first switches may be controlled by a first clock signal and the second switches may be controlled by a second clock signal, wherein the first and second clock signals are non-overlapping. The non-overlapping clock signals ensure that the first and second clock signals never cause their associated first and second switches to be closed (conductive, in a low-ohmic state) at the same time as to prevent cross-conduction. The first switches and the second switches thus alternate between the first switches being closed while the second switches are open and the first switches being open while the second switches are closed. Throughout this text, the term "closed" is used for switches that are "on", meaning that the provide a low-ohmic electrical path between their primary and secondary terminals. Likewise, the term "open" is used for switches that are "off", meaning that they do not provide a low-ohmic electrical path between their primary and secondary terminals.

The first and second clock signals may comprise a first phase, in which the first switches are closed, and the second switches are open, and second phase, in which the first switches are open and the second switches are closed, wherein the first and second phases are separated in time by a pause duration, in which both the first switches and the second switches are open. This ensures that the first and second switches are never closed at the same time, which would lead to cross-conduction and potentially cause damage to the MIMO SC DC-DC converter and/or connected systems.

One or more of the voltage stages may comprise an input of the two or more inputs and/or and output of the two or more outputs. The MIMO SC DC-DC converter may comprise five to ten voltage stages. The MIMO SC DC-DC converter may have a ladder topology, e.g., an asymmetric ladder topology.

Each voltage stage below the highest voltage stage may be configured so that:

when the first switch is closed, its lower flying capacitor terminal has a low-ohmic connection to the lower second capacitor terminal of the voltage stage above it and the lower flying capacitor terminal has a low-ohmic connection to the upper second capacitor, and when the second switch is closed, its upper flying capacitor terminal has a low-ohmic connection to its upper second capacitor terminal and its upper flying capacitor terminal has a low-ohmic connection to the lower second capacitor terminal of the voltage stage above it.

The MIMO SC DC-DC may comprise a bootstrap capacitor and/or a bootstrap diode arranged to connect the flying capacitor of the highest voltage stage to the input of the two or more inputs that is configured for receiving the highest voltage input. It is advantageous to include a bootstrap capacitor and/or a bootstrap diode as this makes start-up of the MIMO SC DC-DC easier and provides a voltage level above the input voltage level to efficiently drive N-type transistors.

The MIMO SC DC-DC may comprise a third capacitor coupled to the input of the two or more inputs that is configured for receiving the highest voltage input and to the input of the two or more inputs that is configured for receiving the second highest voltage input. The third capacitor is arranged between the input of the two or more inputs that is configured for receiving the highest voltage input and the input of the two or more inputs that is configured for receiving the second highest voltage input. This enables the MIMO SC DC-DC to function as a step-up converter when the battery cell voltage drops to a voltage level where the input of the two or more inputs that is configured for receiving the highest voltage input is no longer the suitable input, so the battery cell voltage is routed to one of the lower inputs. In such cases, it will be advantageous if the MIMO SC DC-DC can function as a step-up converter if the hearing device comprise electronic components that require a voltage higher than the current battery cell voltage.

The signal processing unit may be comprised by a signal processing chip, and the MIMO SC DC-DC converter may be integrated or co-integrated in the signal processing chip. When the MIMO SC DC-DC converter is co-integrated in the signal processing chip, one or more of the flying capacitors and/or one or more of the second capacitors may be implemented outside the signal processing chip, for example as discrete multilayer ceramic capacitors or capacitors integrated in a silicon interposer. When the MIMO SC DC-DC converter is co-integrated in the signal processing chip, one or more of the first switches and/or one or more of the second switches may be implemented in the signal processing chip. The first switches and/or the second switches may be integrated metal-oxide-semiconductor field effect transistors, MOSFETs. The flying capacitors, the second capacitors, the third capacitor, and/or the bootstrap capacitor may be integrated metal-oxide-semiconductor, MOS, capacitors, metal-oxide-metal, MOM, capacitors, metal-insulator-metal, MIM, capacitors, or (deep) trench capacitors.

The voltage output provided by each output may depend on the voltage level of the voltage input and/or which input is provided with the voltage input.

FIG. 1*a* shows a hearing device 100, which in the shown embodiment is a RIE- or MaRie-type hearing aid. The hearing device 100 comprises a BTE component 102 adapted to be worn behind the ear of the user and an ITE component 104 adapted to be worn in the ear of the user. The hearing device comprises one or more input transducers 106, e.g., one or more microphones and/or one or more bone vibration sensors, configured for capturing sound in ambient air or through vibrations in the user's body respectively. The one or more input transducers may be arranged in the BTE component 102 and/or in the ITE component 104. The hearing device 100 comprises at least one output transducer, e.g., a loudspeaker, which in the shown embodiment is arranged in the ITE component 104, but which may alternatively be arranged in the BTE component 102. The BTE component 102 and the ITE component 104 are coupled by a connector 103 which comprises one or more electrically conducting wires for transferring electric signals between the BTE component 102 and the ITE component 104. In embodiments where the output transducer is arranged in the BTE component 102, the connector 103 comprises a hollow core for providing a fluid connection to the ITE component 104 for sound generated by the output transducer to be guided to the ear.

FIG. 1*b* shows a schematic view of the BTE component 102 of the hearing device 100 shown in FIG. 1*a*. The BTE component 102 comprises an input transducer 106 in the form of a microphone. The input transducer 106 is coupled to a signal processing unit 108 adapted to process the signals representing the sound captured by the input transducer 106. The BTE component 102 comprises an electrical interface 114 configured for being connected to the connector 103 and therethrough to the ITE component 104. Through the electrical interface 114, the signal processing unit 108 is connected to the output transducer, whereby processed signals may be sent to the output transducer and converted into an acoustic output.

The hearing device 100 further comprises a battery 110, preferably a rechargeable battery, e.g., a Li-Ion battery. The battery can supply a battery cell voltage, e.g., 4.2V when at full capacity. As the battery 110 goes through its discharge cycle the battery cell voltage will drop whereby the battery 110 will supply a reduced battery cell voltage. The battery 110 is connected to an input power de-multiplexer 112 configured for receiving the battery cell voltage, and depending on the current battery cell voltage, route the battery cell voltage to a suitable input of a MIMO SC DC-DC converter 300.

The MIMO SC DC-DC converter 300 comprises multiple inputs, each configured for receiving a voltage input. The MIMO SC DC-DC converter 300 may thus receive the battery cell voltage at one of the inputs, and convert the battery cell voltage, e.g., step up or step down, whereby the outputs may provide a voltage output that depends on the voltage level of the voltage input and which input the voltage input is supplied to. The MIMO SC DC-DC converter 300 is configured for converting the battery cell voltage received at one of the inputs to multiple voltage outputs with different voltages and provide the voltage outputs from respective outputs.

The different electronic components of the hearing device 100, e.g., the input transducer 106, the output transducer, and the signal processing unit 108, may thus be supplied with power from the output of the MIMO SC DC-DC converter 300 that provides the output voltages closest to the voltage the respective electronic component is configured to operate at. Examples of the MIMO SC DC-DC converter 300 and the voltage stages 200 will be disclosed in detail below.

FIG. 2 shows an example of a voltage stage 200 comprised by the MIMO SC DC-DC converter 300. The voltage stage 200 comprises a first upper connection node 202 and a second upper connection node 204 for connecting the voltage stage 200 to another voltage stage 200 in a higher voltage domain and/or to an input 218 of the multiple inputs. The voltage stage 200 comprises a first lower connection node 206 and a second lower connection node 208 for connecting the voltage stage 200 to another voltage stage 200 in a lower voltage domain and/or to a ground connection 312.

The voltage stage 200 comprises a flying capacitor 210 with an upper flying capacitor terminal connected to the first upper connection node 202, and a lower flying capacitor terminal connected to the first lower connection node 206. The voltage stage 200 comprises a second capacitor 212 with an upper second capacitor terminal galvanically connected to the second upper connection node 204, and a lower second capacitor terminal connected to the second lower connection node 208.

The voltage stage 200 comprises a first switch 214 with a lower first switch terminal galvanically connected to the first lower connection node 206 and the lower flying capacitor terminal, and an upper first switch terminal galvanically connected to the second upper connection node 204 and the upper second capacitor terminal. The voltage stage 200 comprises a second switch 216 with an upper second switch terminal galvanically connected to the first upper connection node 202 and the upper flying capacitor terminal, and a lower second switch terminal galvanically connected to the first upper connection node 204, the upper first switch terminal, and the upper second capacitor terminal.

Through this configuration, the second switch 216 is adapted for selectively providing a low-ohmic electrical connection between the upper flying capacitor terminal and the upper second capacitor terminal, while the first switch 214 is adapted for selectively providing a low-ohmic electrical connection between the lower flying capacitor terminal and the upper second capacitor terminal. Each of the first switch 214 and the second switch 216 are preferably provided by a controllable semiconductor switch, such as a transistor. Each of the first switch 214 and the second switch 216 may advantageously be implemented in fully-depleted silicon-on-insulator, FDSOI, semiconductor processes.

The first switch 214 is controlled by a first clock signal $\varphi_1$ and the second switch 216 is controlled by a second clock signal $\varphi_2$. The first and second clock signals $\varphi_1$, $\varphi_2$ are complimentary, meaning that they control the first and second switches 214, 216 so that the first switch 214 and the second switch 216 are never closed at the same time. Preferably, the first and second clock signals $\varphi_1$, $\varphi_2$ are separated by a pause duration 506 between opening the first switch 214 and closing the second switch 216 and between closing the first switch 214 and opening the second switch 216, in which pause duration 506 both the first switch 214 and the second switch 216 are open, i.e., off. When this is the case, the clock signals are said to be non-overlapping.

The voltage stage 200 may comprise an input node 218 providing an input of the one or more inputs. The input node 218 can be coupled to the battery 110, e.g., via the input power de-multiplexer 112, so that the input node 218 can receive a voltage input. The voltage stage 200 may comprise an output node 220 providing an output of the one or more outputs. The output node 220 can be coupled to electronic components of the hearing device 100 that are configured for running on the voltage provided by that output node 220.

FIG. 3 shows an example of the MIMO SC DC-DC converter 300 comprising multiple voltage stages 200 as described for FIG. 2. The MIMO SC DC-DC converter 300 comprises a highest voltage stage 302, i.e., the voltage stage 200 amongst the multiple voltage stages that is configured to be in the highest voltage domain amongst the multiple voltage stages. The MIMO SC DC-DC converter 300 comprises a lowest voltage stage 304, i.e., the voltage stage 200 amongst the multiple voltage stages that is configured to be in the lowest voltage domain amongst the multiple voltage stages. The MIMO SC DC-DC converter 300 comprises n middle voltage stage(s) 306, where n is a positive integer or 0.

The voltage stages 302, 304, 306 are connected, so that a respective voltage stage will be connected to its adjacent upper voltage stage through a connection of its first upper connection node 202 to the adjacent upper voltage stage's first lower connection node 206 and a connection of its second upper connection node 204 to the adjacent upper voltage stage's second lower connection node 208. For the highest voltage stage 302, that does not have an adjacent upper voltage stage, the first upper connection node 202 is connected to a highest input node 314, i.e., the input of the two or more inputs that is configured for receiving the highest voltage. The first upper connection node 202 is connected to the highest input node 314 via a first switch 308. In the shown embodiment, the second upper connection node 204 is left un-connected.

Likewise, a respective voltage stage will be connected to its adjacent lower voltage stage through a connection of its first lower connection node 206 to the adjacent lower voltage stage's first upper connection node 202 and a connection of its second lower connection node 206 to the adjacent lower voltage stage's second upper connection node 204. For the lowest voltage stage 304, that does not have an adjacent lower voltage stage, the first and second lower connection nodes 206, 208 are connected to ground 312. The first lower connection node 206 is connected to ground via a second switch 310 whereas the second lower connection node 208 is directly connected to ground 312.

Through this arrangement of the voltage stages 200, the MIMO SC DC-DC converter 300 has a ladder topology that allow a voltage output for each voltage stage 200. Additionally, these multiple voltage outputs are simultaneously available, meaning that all voltage outputs are available at the same time. For the shown ladder topology, the voltage output provided at each voltage stage is given by the following equation:

$$V_{ox} = V_{bat} \cdot \frac{x}{y} \quad \text{(eq. 1)}$$

where x is the number of a voltage stage counted from the lowest voltage stage, $V_{ox}$ is the output voltage of voltage stage x, $V_{bat}$ is the input voltage provided by the battery, and y is the number of the voltage stage where the voltage input is applied counted from the lowest voltage stage 304. Here it is important to note that the voltage level of respective voltage stage 200 is not constant but will vary depending on the voltage input and to which voltage stage the voltage input is applied. This also means that the shown MIMO SC DC-DC converter 300 has more possible output voltages than the number of voltage stages, as the voltage output of a voltage stage may be changed by controlling the voltage level of the voltage input and/or the voltage stage to which the voltage input is applied.

Figure 4:
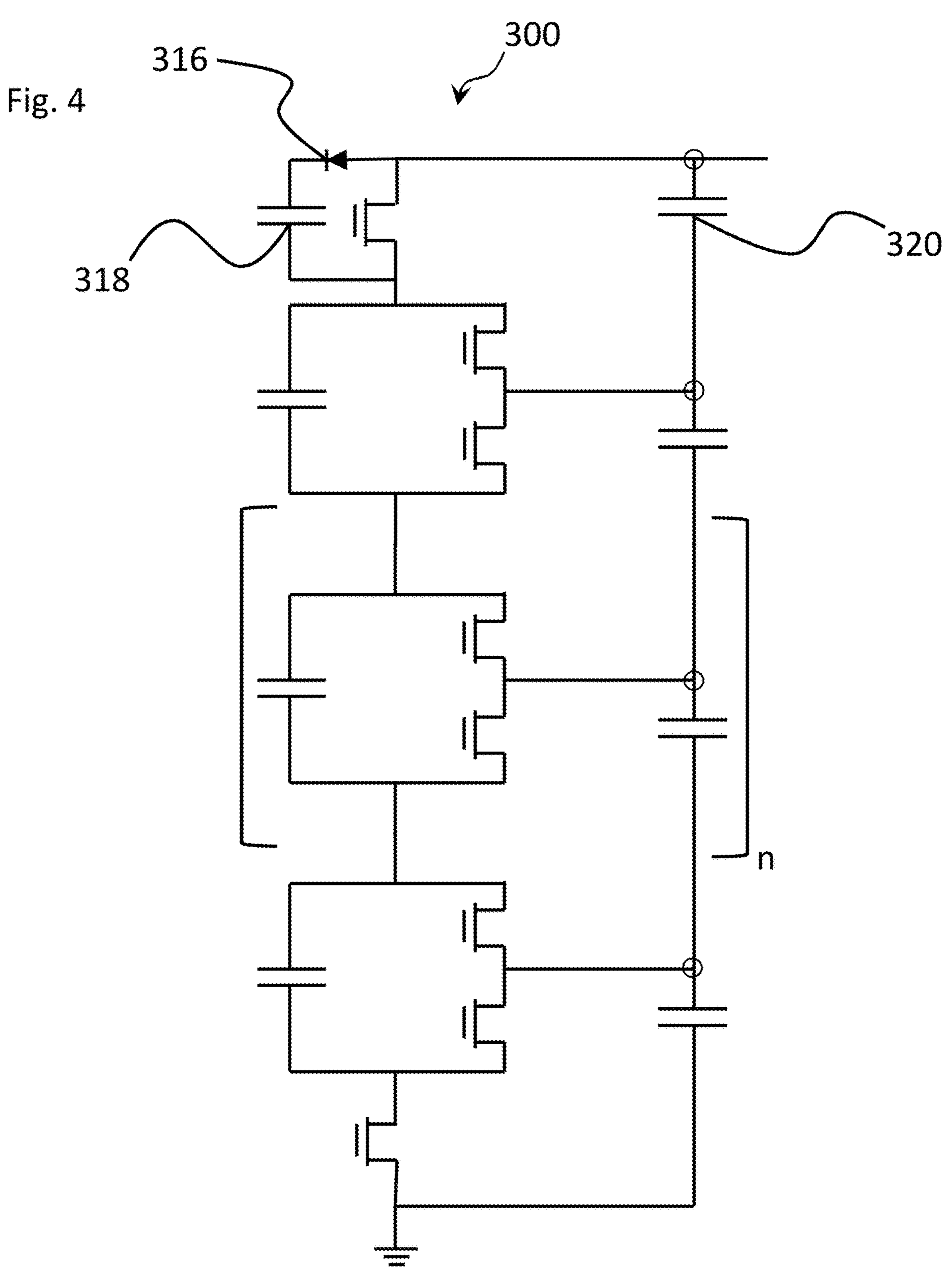
FIG. 4 is a schematic drawing of a multiple input multiple output switched capacitor DC-DC converter.

FIG. 4 illustrates a further development of the MIMO SC DC-DC converter 300 shown in FIG. 3. This MIMO SC DC-DC converter 300 further comprises a third capacitor 320 arranged between and connecting the highest input 314 and the second upper connection node 204 of the highest voltage stage 302. It is advantageous to include the third capacitor 320 as it enables the MIMO SC DC-DC converter 300 to perform step-up conversion of a voltage input applied to a lower voltage stage up to the voltage level of the highest input 314, which may thereby also act as an output.

The MIMO SC DC-DC converter 300 also comprises a bootstrap diode 316 and a bootstrap capacitor 318 arranged between the first upper connection node 202 of the highest voltage stage 302 and the highest voltage node 314. The bootstrap diode 316 and the bootstrap capacitor 318 are arranged in series with each other, and the two are arranged in parallel with the first switch 308 that connects the first upper connection node 202 of the highest voltage stage 302 and the highest voltage node 314. The bootstrap diode 316 and the bootstrap capacitor 318 are advantageous as they make the startup of the MIMO SC DC-DC converter 300 easier.

Figure 5:
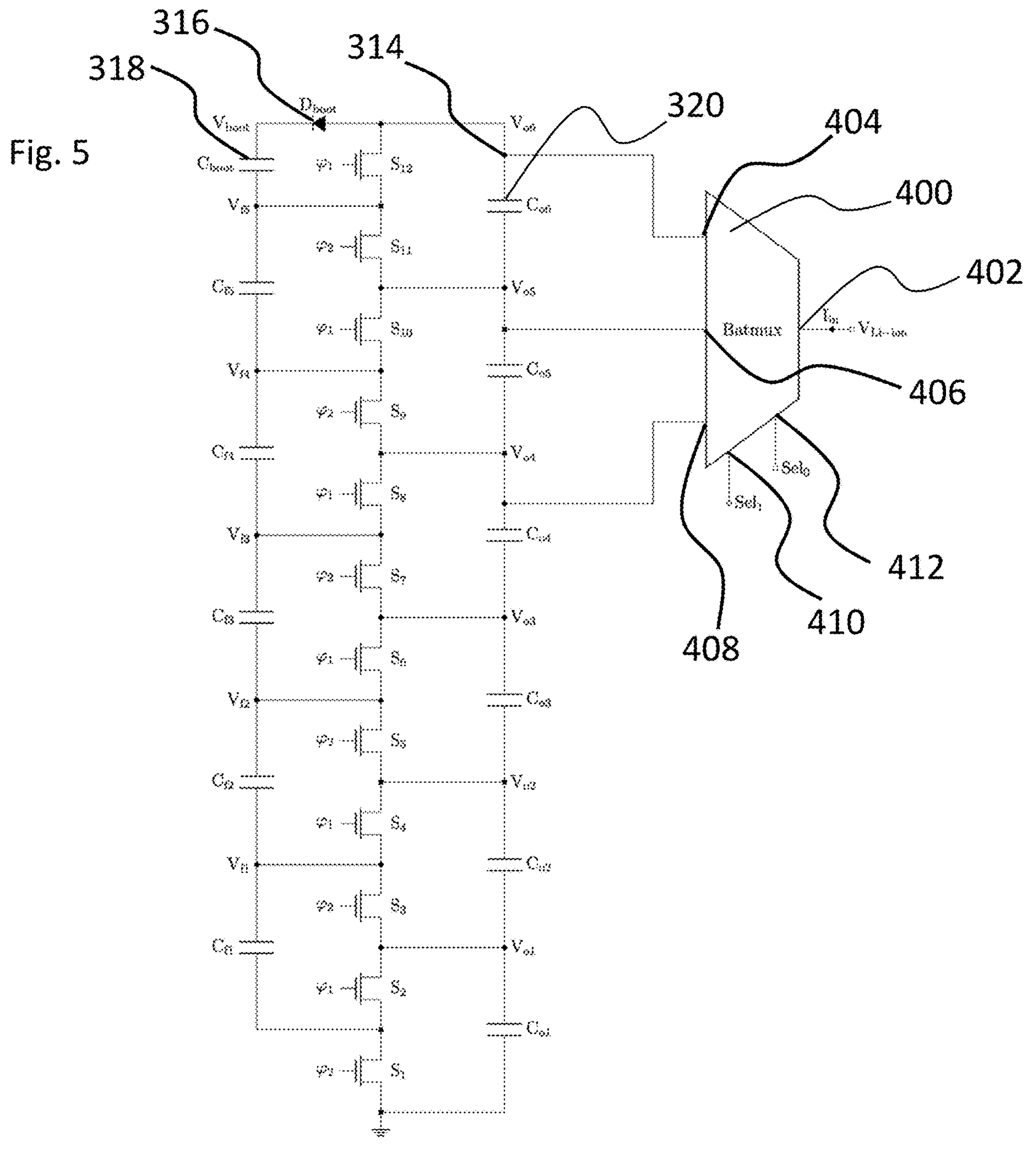
FIG. 5 is a schematic drawing of a multiple input multiple output switched capacitor DC-DC converter.

FIG. 5 shows an example of the MIMO SC DC-DC converter 300 of FIG. 4, where n is 3 so that the MIMO SC DC-DC converter 300 comprises 5 voltage stages 200, i.e., a highest voltage stage 302, a lowest voltage stage 304, and three middle voltage stages 306. The shown MIMO SC DC-DC converter 300 also comprises the third capacitor 320 to enable step-up conversion and a bootstrap diode 316 and a bootstrap capacitor 318 to facilitate startup. The first switches ($S_{even}$) are controlled by a first clock signal $\varphi_1$, and the second switches ($S_{odd}$) are controlled by a second clock signal $\varphi_2$.

In this configuration, the MIMO SC DC-DC converter 300 comprises 6 voltage nodes, i.e., one for each voltage stage and the highest input node 314, which may be used as inputs and/or outputs. The voltage nodes are denoted $V_{o1}$, $V_{o2}$, $V_{o3}$, $V_{o4}$, $V_{o5}$, and $V_{o6}$, where the o is short for output, although it may also be used for input, and the number 1-6 denotes the number of the voltage node counted from the lowest voltage stage 304 upwards.

The MIMO SC DC-DC converter 300 comprises an input power de-multiplexer 112, 400, also denoted Batmux, which selectively connects the battery 110 to at least some of the inputs, i.e., routes the input voltage to a selected one of the inputs. The input power de-multiplexer 112, 400 comprises a de-multiplexer input 402 coupled to the battery 110 for receiving the battery cell voltage. The input power de-multiplexer 112, 400 also comprises a first de-multiplexer output 404 coupled to the highest input node 314, $V_{o6}$, a second de-multiplexer output 406 coupled to the input node of the highest voltage stage, $V_{o5}$, and a third de-multiplexer output 408 coupled to the input node of the voltage stage below the highest voltage stage, $V_{o4}$. The input power de-multiplexer 112, 400 may comprise fewer or more de-multiplexer outputs and/or the de-multiplexer outputs may be coupled to other voltage inputs. It is noted the input power de-multiplexer 112, 400 is controlled to select one of the de-multiplexer outputs at a time so that only one input receives an input voltage at any given time.

Through the de-multiplexer outputs 404, 406, 408, the input power de-multiplexer 112, 400 may route the battery cell voltage to the desired input of the MIMO SC DC-DC converter 300, thereby providing the voltage input for conversion. The input power de-multiplexer 112, 400 comprises one or more control ports 410, 412 which can be coupled to the signal processing unit 108 or a dedicated control circuit. Through the control port(s) 410, 412, the input power de-multiplexer 112, 400 may be controlled to set which of the de-multiplexer outputs 404, 406, 408 should be used, and thus also which of the inputs of the MIMO SC DC-DC converter 300 should receive the voltage input.

The voltage at the voltage nodes $V_{o1}$, $V_{o2}$, $V_{o3}$, $V_{o4}$, $V_{o5}$, and $V_{o6}$ will depend on the level of the voltage input, and which input the input power de-multiplexer 112, 400 provides with the voltage input according to eq. 1. Table 1 in FIG. 9 show the voltage level of the voltage output provided by each voltage node depending on the voltage level of the voltage input applied to the highest input node 314, $V_{o6}$.

For the example shown in table 1 in FIG. 9, the battery is provided by a Li-Ion battery, which can provide a battery cell voltage of 4.2 V when fully charged. While each of the electrical components of the hearing device 100 are configured for running on their respective optimal voltages, they may run on a voltage deviating from this if the provided voltage is not so high that it damages the electrical components or so low that it cannot power the respective component. However, it is desired to run a component with a voltage as close to its optimal voltage as possible as this improves power efficiency and component performance. Hence it is advantageous to have multiple voltage outputs available simultaneously as this allows multiple electrical components with different optimal voltages to be run simultaneously and run at their most efficient. Furthermore, linear low dropout regulators may be used to alleviate issues with too high voltages if desired.

If the hearing device requires different voltage outputs, the voltage input may simply be applied to another of the input nodes. Tables 2 and 3 in FIGS. 10 and 11 respectively show the voltage outputs available when the voltage input is applied to $V_{o5}$ and $V_{o4}$ respectively.

In table 3 shown in FIG. 11, the asterisks indicate an overvoltage in an implementation where all switches, i.e., first and second switches, are effective thin-oxide (1.0 V nominal (+10% max)) NMOS transistors. This is possible due to the stacked voltage domains that occur by using this topology. These stacked voltage domains furthermore make gate-driving simple, even when using high-side NMOS transistors. By adding a simple integrated bootstrap circuit ($C_{boot}$ and $D_{boot}$) implemented using MOS capacitors and diode coupled NMOS transistors, use of PMOS power switches can be avoided altogether.

Figure 6:
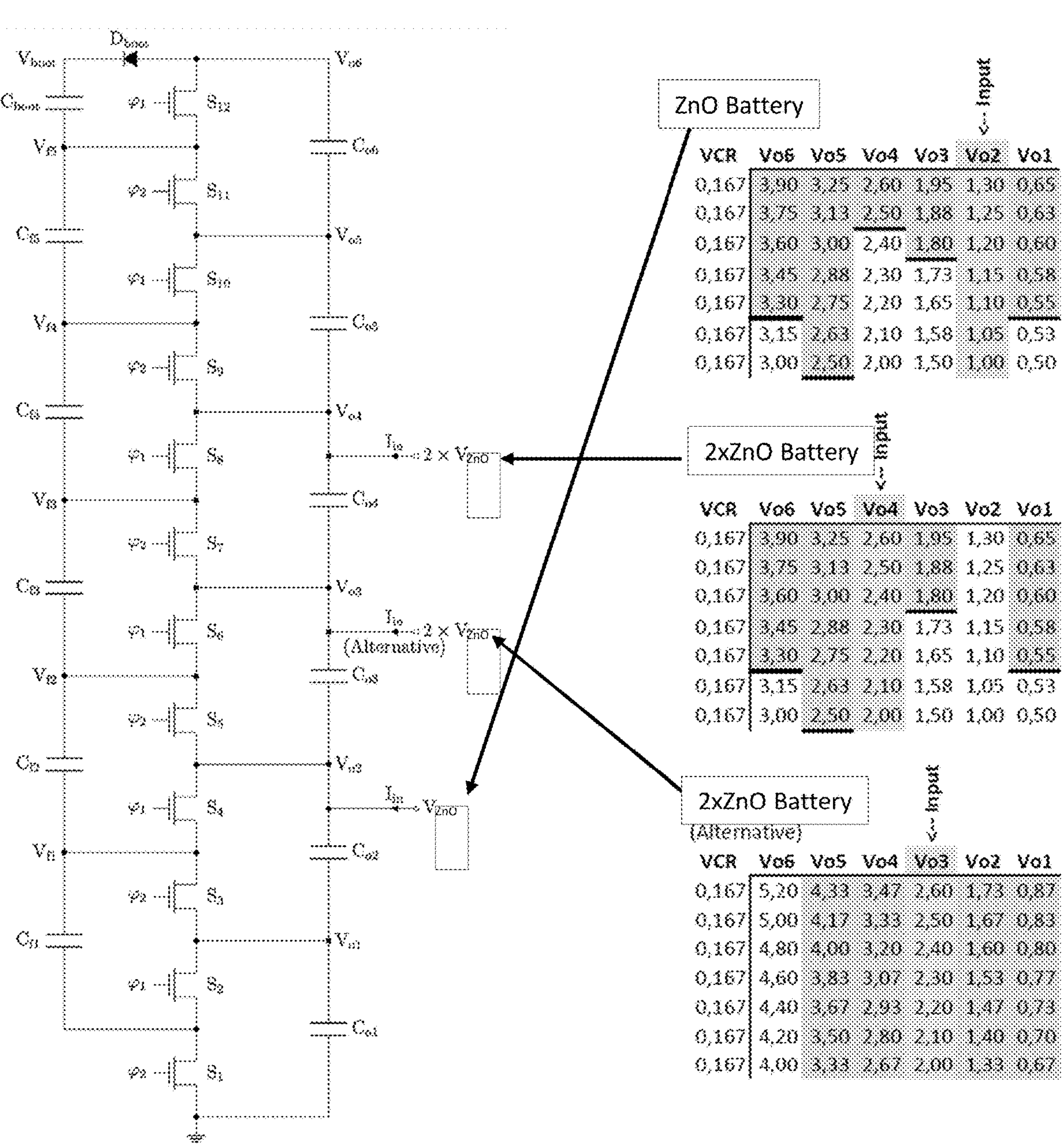
FIG. 6 is a schematic drawing of a multiple input multiple output switched capacitor DC-DC converter.

FIG. 6 shows the MIMO SC DC-DC converter 300 of FIG. 6 without the input power de-multiplexer 112, 400 and where the battery 110 is provided by a zinc-air, ZnO, battery that provides a battery cell voltage of 1.3 V when at full capacity. The battery 110 is coupled to the second lowest input $V_{o2}$ through a switch (not shown). An alternative use case might call for two series-connected ZnO batteries, in which case the series-connected batteries (REFERENCE TO FIG?) can be coupled to the fourth lowest input $V_{o4}$ or alternatively to the third lowest input $V_{o3}$. The three tables to the right, show the possible voltage outputs that can be provided by the outputs, depending on the voltage level of the voltage input and to which input the voltage input is provided.

Due to the bi-directionality inherent to the topology of the shown the MIMO SC DC-DC converter 300, step-up conversion is possible. Thus, when either one or more ZnO batteries are connected to the input nodes $V_{o2}$, $V_{o5}$ or $V_{o4}$ respectively, the converter will be able to supply the same voltages as with a Li-Ion battery, thereby allowing ZnO compatibility with a Li-Ion device without any changes to device.

Figure 7:
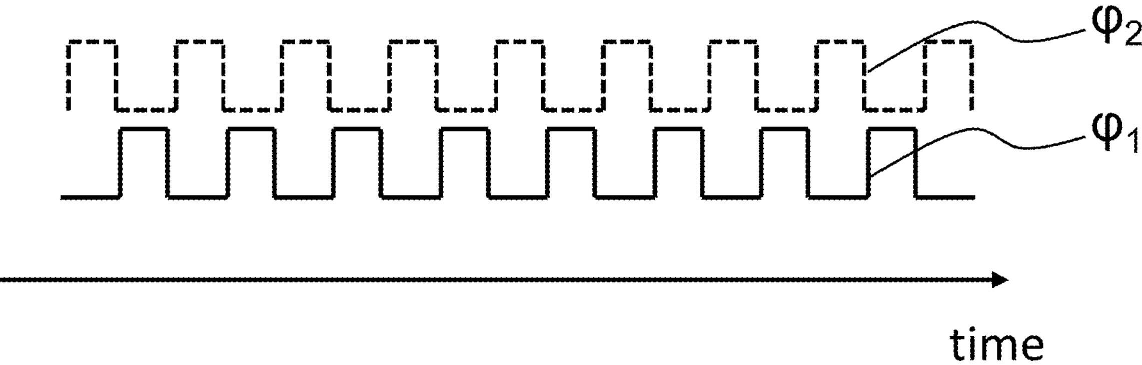
FIG. 7 is a graph showing first and second clock signals displaced relative to each other.

FIG. 7 is a graph that shows the voltage of the first clock signal $\varphi_1$ and the voltage of the second clock signal (2 as a function of time. As explained above, the first clock signal $\varphi_1$ is applied to the gates of the first switches 214 and the second clock signal $\varphi_2$ is applied to the gates of the second switches 216. In FIG. 7, the second clock signal 2 has been displaced upward for easy comparison with the with the first clock signal $\varphi_1$. As can be seen on the figure, the first and second clock signals $\varphi_1$, $\varphi_2$ each change between respective up-periods, also referred to as positive duty cycles, and down-periods and are complimentary so that the first and second switches alternate between being open and closed. If the first and second switches 214, 216 are implemented with NMOS transistors, they will close/become conducting during up-periods of their controlling clock signal and open/become isolating during down-periods of their controlling clock signal.

Figure 8:
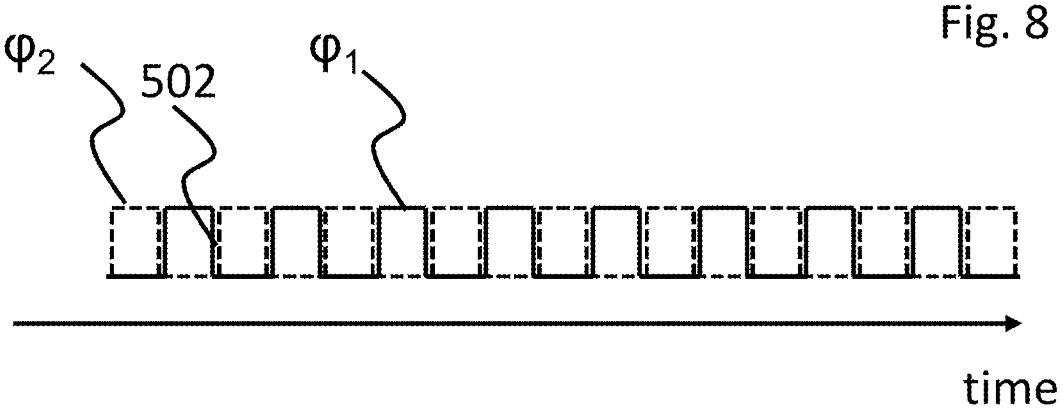
FIG. 8 is a graph showing first and second clock signals.

FIG. 8 is similar to FIG. 7 but shows the first clock signal $\varphi_1$ and the second clock signal $\varphi_2$ overlaid. Here it can be seen that there is a pause duration 502 put in between the positive duty cycles of the first clock signal $\varphi_1$ and the positive duty cycles of the second clock signal $\varphi_2$ so that the first and second switches 214, 216 are never closed at the same time, i.e., they are non-overlapping. This makes it easier to control the MIMO SC DC-DC converter 300 as it is avoided that the first and second switches 214, 216 are closed at the same time, which could result in damage to the various components of the MIMO SC DC-DC converter 300.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It is to be noted that the word "comprising" does not necessarily exclude the presence of other elements or steps than those listed. It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

100 Hearing device
102 BTE component
103 Connector
104 ITE component
106 Input transducer
108 Signal processing unit
110 Battery
112 Input power de-multiplexer
114 Electrical interface
200 Voltage stage
202 First upper connection node
204 Second upper connection node
206 First lower connection node
208 Second lower connection node
210 Flying capacitor
212 Second capacitor
214 First switch
216 Second switch
218 Input node
220 Output node
300 Multiple input multiple output switched capacitor DC-DC converter
302 Highest voltage stage 304 Lowest voltage stage
306 Middle voltage stage
308 First switch
310 Second switch
312 Ground
314 Highest input
316 Bootstrap diode
318 Bootstrap capacitor
320 Third capacitor
400 Input power de-multiplexer
402 De-multiplexer input
404 First de-multiplexer output
406 Second de-multiplexer output
408 Third de-multiplexer output
410 Control port
412 Control port
$\varphi_1$ First clock Signal
$\varphi_2$ Second clock Signal
502 Pause duration

The invention claimed is:

1. A hearing device configured to be worn at an ear of a user, wherein the hearing device comprises:
an input transducer configured to capture sound and to provide a microphone input transducer signal based on the captured sound;
a signal processing unit configured to process the input transducer signal and to provide an output signal based on the processed input transducer signal;
an output transducer configured to provide a stimulation output signal based on the output signal;
a battery configured to provide a battery cell voltage; and
a multiple-input-multiple-output (MIMO) switched capacitor (SC) DC-DC converter coupled to the battery and comprising:
two or more inputs, each of the two or more inputs configured to receive a voltage input, and
two or more outputs configured to provide respective voltage outputs, the voltage outputs being different from each other, wherein at least two of the two or more outputs are capable of providing the respective voltage outputs simultaneously;
wherein at least one of the voltage outputs is based on one of the voltage inputs; and
wherein the signal processing unit is implemented in a hearing device signal-processing chip, and wherein at least a part of the MIMO SC DC-DC converter is implemented in the hearing device signal-processing chip.

2. A hearing device configured to be worn at an ear of a user, wherein the hearing device comprises:
an input transducer configured to capture sound and to provide a microphone input transducer signal based on the captured sound;
a signal processing unit configured to process the input transducer signal and to provide an output signal based on the processed input transducer signal;
an output transducer configured to provide a stimulation output signal based on the output signal;
a battery configured to provide a battery cell voltage; and
a multiple-input-multiple-output (MIMO) switched capacitor (SC) DC-DC converter coupled to the battery and comprising:
two or more inputs, each of the two or more inputs configured to receive a voltage input, and
two or more outputs configured to provide respective voltage outputs, the voltage outputs being different from each other, wherein at least two of the two or more outputs are capable of providing the respective voltage outputs simultaneously;
wherein at least one of the voltage outputs is based on one of the voltage inputs; and
wherein the hearing device further comprises an input power de-multiplexer having a de-multiplexer input coupled to the battery.

3. The hearing device according to claim 2, wherein the input power de-multiplexer further comprises:
a first de-multiplexer output coupled to a first input of the two or more inputs, and
a second de-multiplexer output coupled to a second input of the two or more inputs.

4. A hearing device configured to be worn at an ear of a user, wherein the hearing device comprises:
an input transducer configured to capture sound and to provide a microphone input transducer signal based on the captured sound;
a signal processing unit configured to process the input transducer signal and to provide an output signal based on the processed input transducer signal;
an output transducer configured to provide a stimulation output signal based on the output signal;
a battery configured to provide a battery cell voltage; and
a multiple-input-multiple-output (MIMO) switched capacitor (SC) DC-DC converter coupled to the battery and comprising:
two or more inputs, each of the two or more inputs configured to receive a voltage input, and
two or more outputs configured to provide respective voltage outputs, the voltage outputs being different from each other, wherein at least two of the two or more outputs are capable of providing the respective voltage outputs simultaneously;
wherein at least one of the voltage outputs is based on one of the voltage inputs; and
wherein the MIMO SC DC-DC converter comprises multiple voltage stages, each of the voltage stages comprising:
a first capacitor having an upper first capacitor terminal and a lower first capacitor terminal;
a second capacitor having an upper second capacitor terminal and a lower second capacitor terminal;
a first switch; and
a second switch; and
wherein the signal processing unit is implemented in a hearing device signal-processing chip, and wherein at least a part of the MIMO SC DC-DC converter is implemented in the hearing device signal-processing chip.

5. The hearing device according to claim 4, wherein the upper first capacitor terminal comprises an upper flying capacitor terminal, and wherein the lower first capacitor terminal comprises a lower flying capacitor terminal.

6. The hearing device according to claim 4, wherein the voltage stages comprise a highest voltage stage, wherein the voltage stages are coupled together, and wherein one of the voltage stages below the highest voltage stage comprises:
a galvanic connection from the upper first capacitor terminal of the one of the voltage stages, to the lower first capacitor terminal of the voltage stage above it, and
a galvanic connection from the upper second capacitor terminal of the one of the voltage stages, to the lower second capacitor terminal of the voltage stage above it.

7. The hearing device according to claim 4, wherein the first switches are controlled by a first clock signal, and the second switches are controlled by a second clock signal, and wherein the first and second clock signals are complementary.

8. The hearing device according to claim 4, wherein voltage stages of the MIMO SC DC-DC converter comprise five to ten voltage stages.

9. The hearing device according to claim 4, wherein the voltage stages comprise a highest voltage stage; and wherein, when the first switches are closed, the upper first capacitor terminal of one of the voltage stages below the highest voltage stage has a low-ohmic electrical connection to the upper second capacitor terminal of the voltage stage above the one of the voltage stages, and the lower first capacitor terminal of the one of the voltage stages has a low-ohmic electrical connection to the lower second capacitor terminal of the voltage stage above the one of the voltage stages.

10. The hearing device according to claim 4, wherein the voltage stages comprise a highest voltage stage; and wherein, when the second switches are closed, the upper first capacitor terminal of one of the voltage stages below the highest voltage stage has a low-ohmic electrical connection to the upper second capacitor terminal of the one of the voltage stages, and the lower first capacitor terminal of the one of the voltage stages has a low-ohmic electrical connection to the lower second capacitor terminal of the one of the voltage stages.

11. The hearing device according to claim 1, wherein the MIMO SC DC-DC converter has a ladder topology.

12. The hearing device according to claim 1, wherein the voltage output provided by one of the outputs depends on a voltage level of one of the voltage inputs.

13. The hearing device according to claim 2, wherein the MIMO SC DC-DC converter has a ladder topology.

14. The hearing device according to claim 2, wherein the signal processing unit comprises a signal processing chip, and wherein the MIMO SC DC-DC converter is integrated or co-integrated in the signal processing chip.

15. The hearing device according to claim 2, wherein the signal processing unit is implemented in a hearing device signal-processing chip, and wherein the MIMO SC DC-DC converter comprises a first capacitor and a second capacitor implemented in the hearing device signal-processing chip.

16. The hearing device according to claim 2, wherein the signal processing unit is implemented in a hearing device signal-processing chip, and wherein the MIMO SC DC-DC converter comprises a first switch and a second switch implemented in the hearing device signal-processing chip.

17. The hearing device according to claim 4, wherein the MIMO SC DC-DC converter has a ladder topology.

18. The hearing device according to claim 4, wherein the first capacitor and the second capacitor are implemented in the hearing device signal-processing chip.

19. The hearing device according to claim 4, wherein the first switch and the second switch are implemented in the hearing device signal-processing chip.

* * * * *